Figure 1:
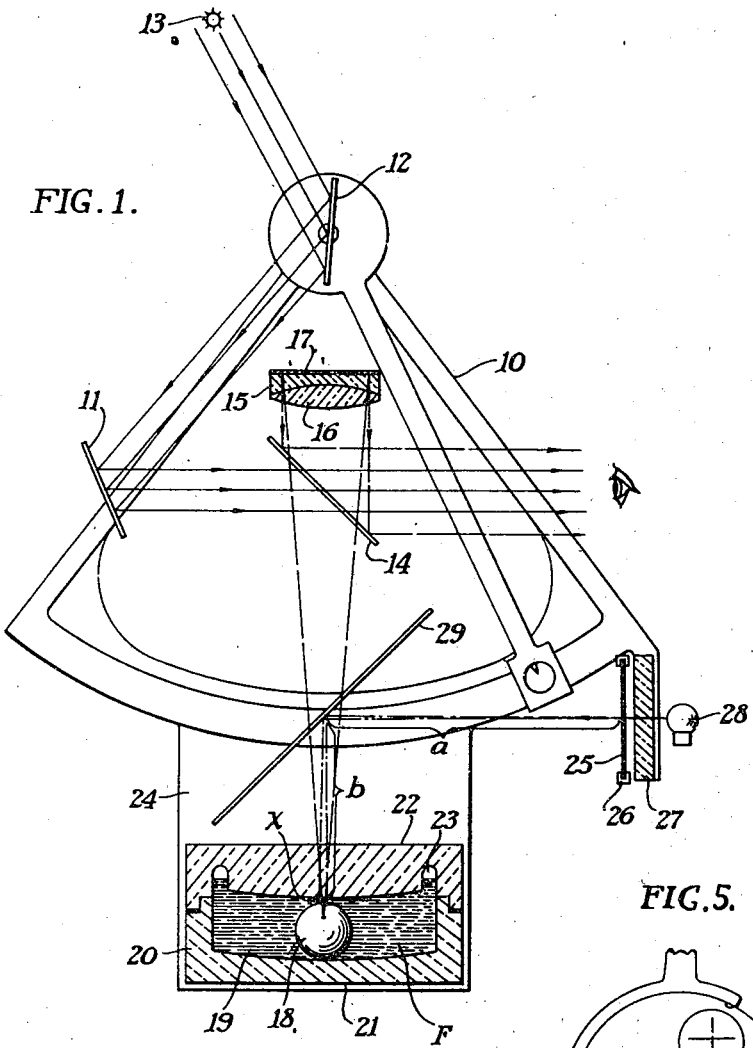

Nov. 5, 1946.  B. E. LUBOSHEZ  2,410,667
ARTIFICIAL HORIZON FOR SIGHTING INSTRUMENTS
Filed April 18, 1944 2 Sheets-Sheet 1

BENJAMIN E. LUBOSHEZ
INVENTOR

BY
ATTORNEYS

BENJAMIN E. LUBOSHEZ
INVENTOR

Patented Nov. 5, 1946

2,410,667

UNITED STATES PATENT OFFICE 2,410,667

ARTIFICIAL HORIZON FOR SIGHTING INSTRUMENTS

Benjamin E. Luboshez, Rochester, N. Y., assignor to Eastman Kodak Company, Rochester, N. Y., a corporation of New Jersey Application April 18, 1944, Serial No. 531,582

17 Claims. (Cl. 88—2.3)

This invention relates to improved sighting instruments for determining the horizontal direction in relation to a point of observation, and particularly to an improved artificial horizon for such instruments.

In such instruments ordinary bubble levels are generally used for the artificial horizon. The main disadvantage of the ordinary bubble level used on such instruments lies in the fact that the size of the bubble varies with changes in temperature and must be adjusted from time to time accordingly. Furthermore, the sensitivity of such a level varies with the size of the bubble, and it is impossible to vary the one without changing the other. It has been proposed to use solid "bubbles" rolling on a concave spherical surface to overcome the undesirable variations in the sizes of the bubbles due to temperature changes.

Whether the horizon used has been an ordinary bubble or a solid "bubble" the image appearing in the instrument has been in the form of a simple bright disk (as with illuminated solid "bubbles") or in the form of a pale disk with a bright periphery such as is usual with the ordinary bubble assembly. In both cases, when such horizons are used on celestial instruments, i. e., sextants, it is difficult to see a star when it lies within the disk. Accordingly, it is the usual practice with such instruments to place the star image more or less along the side of the bubble image.

One object of the present invention is to provide an improved artificial horizon for use with sighting instruments that shall be entirely free from the objections to the prior art structures mentioned above.

Another object is to provide an artificial horizon of the type set forth which is free from variation in size due to temperature changes; which can be varied in shape or size according to the object being observed by the instrument without affecting the sensitivity of the same; and the sensitivity of which can be varied without altering the shape or size of the image of the artificial horizon.

Still another object is to provide an artificial horizon which when associated with a particular instrument will provide an image at the viewpoint of the instrument which moves in unison across the field of view with the object being sighted upon as the instrument as a whole is moved.

Another object is to provide an artificial horizon of the type set forth which includes a ball having a reflecting surface which is in rolling contact with an arcuate race, and which race is such that the ball is free from spin so that it will come to rest at its lowermost position on said race.

Still another object is to provide an artificial horizon of the type set forth which comprises a pattern made up of the optically combined images of two or more individual fiducial marks so that the individual parts of the pattern appear to move independently as the instrument is titlted in different directions.

Figure 2:
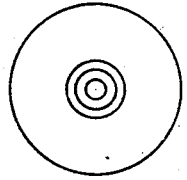
Figure 3:
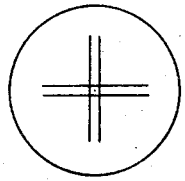
Figure 5:
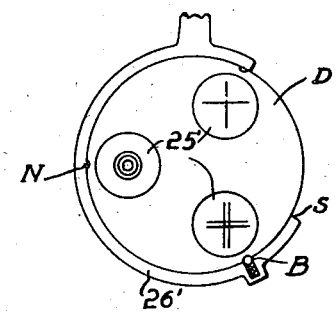
Figure 4:
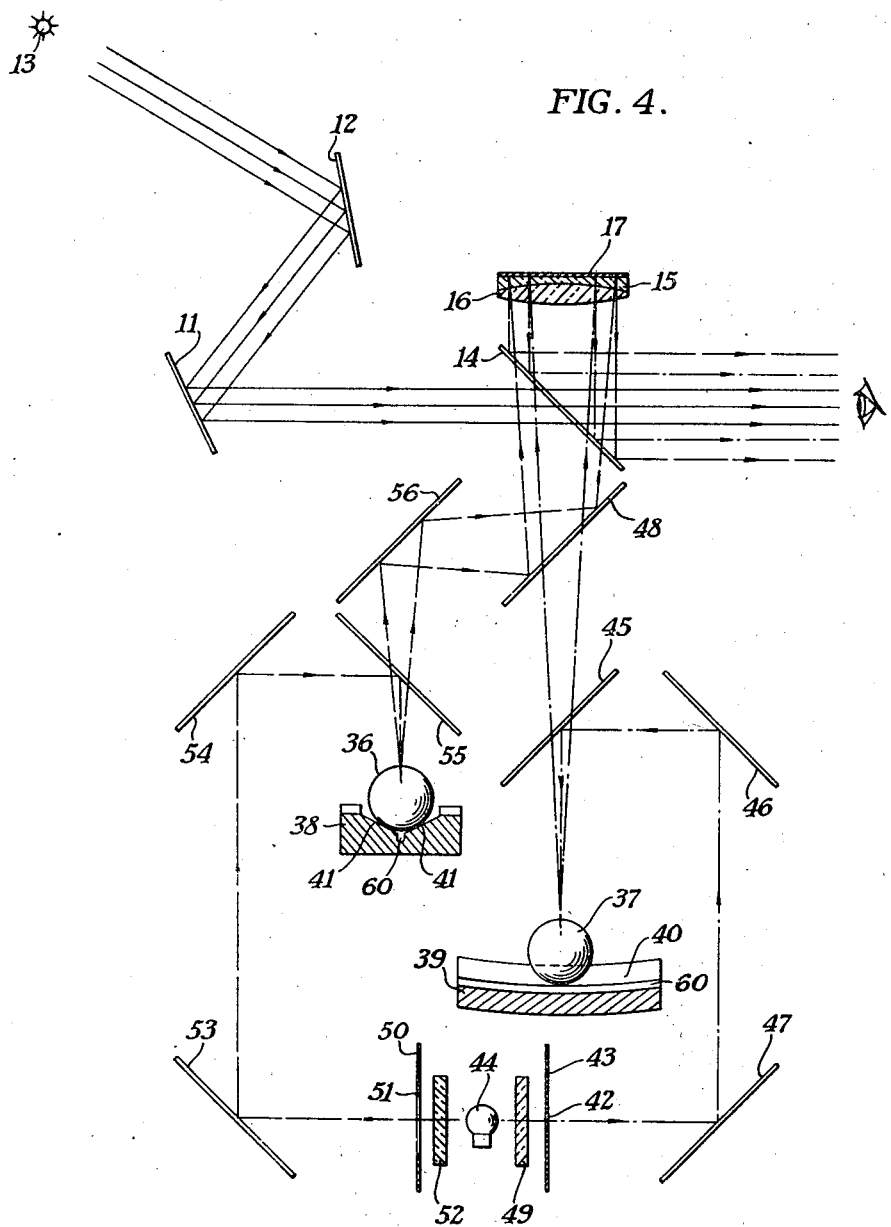

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a schematic showing of an artificial horizontal horizon constructed in accordance with one embodiment of the present invention and shown in operative association with a sextant, Figs. 2 and 3 show two different forms which the horizon images might be, Fig. 4 is a diagrammatic view of another embodiment of the present artificial horizon in association with a sextant, Fig. 5 shows a plurality of masks bearing different fiducial marks mounted on a rotatably-mounted disk for selective use.

Like reference characters refer to corresponding parts throughout the drawings.

Briefly, an artificial horizon according to the present invention comprises a ball having a reflecting surface in rolling contact with an arcuate race which is fixed to the sighting instrument so that the chord of the surface of the race is horizontal when the instrument is in use. The ball naturally seeks the lowest point on the rolling surface as the instrument is tilted and acts the same as a level. The image of one or more fiducial marks are projected onto the surface of the ball and are in turn reflected and/or directed into the viewpoint of the instrument simultaneously with the image of the object being sighted upon.

Although for purposes of disclosing the artificial horizon constituting the present invention, I have shown it in association with a sextant, it is pointed out that the invention is not limited to use with a sighting instrument of this particular type but it is believed that it will be obvious to those skilled in the art that said artificial horizon is applicable to any sighting instrument, such as theodolites, celestial, and terrestrial telescopes, etc., in which the horizontal direction in relation to the point of observation is desirable or necessary.

Referring now to Fig. 1, my artificial horizon is shown in association with a well-known type of sextant which includes a frame 10, a fixed mirror 11, and a pivoted index mirror 12. Light from a celestial body 13 strikes the index mirror 12 and is reflected to the fixed mirror 11 from which it is then reflected to the viewpoint of the instrument, all as shown in full line bearing directional arrows. When directing a bubble image to the viewpoint, such a sextant may include a transparent reflector 14 inclined to the sight axis and a lens-reflector combination 15 composed of a lens 16 backed up by a mirror 17. Divergent rays from a bubble are adapted to pass through the transparent reflector 14 and then through the lens 16 to the mirror 17 and back through the lens 16 to the transparent reflector in the form of collimated light which it is reflected to the viewpoint. This optical system for directing a collimated image of the bubble to the viewpoint of the sextant may be referred to as the secondary optical system of the instrument, the system being used for directing an image of the object being sighted upon to the viewpoint being referred to as the primary optical system of the instrument; and sighting instruments having these two optical systems are well known.

Coming now to the present invention, my artificial horizon is designed to replace the ordinary bubble level as generally used, and one embodiment of it will now be described. As shown in Fig. 1, the present artificial horizon may comprise a metal ball 18 having a polished reflecting surface, a spherical concave rolling surface, or race, 19 of a certain radius, of the damping fluid F, and the lower half of a glass chamber 20, the bottom 21 of which is roughened and painted a matte black to avoid reflections. The glass chamber is sealed with a glass lid 22, an annular space 23 being left around the margin of the lid for expansion of the fluid due to temperature changes, and to trap any air bubbles which might be formed in the fluid. The damping fluid and the glass of the container are selected so as to have substantially the same refractive index. The chamber is fixed to the lower part of the frame of the sextant by a bracket 24 in optical alignment with the lens-reflector combination 15.

Also fixed to the frame 10 of the sextant, above and to one side of the chamber, is a fiducial mark and means for illuminating the same. While the fiducial marks may be of any form, I have found that a particularly good one for this purpose is an illuminated transparent opening in an opaque mask. As shown, an opaque mask 25 is slidably mounted in a holder 26 fixed to the frame 10. This mask includes one or more transparent patterns having any configuration desired and which when illuminated form a bright fiducial mark the image of which is to constitute the horizon. This mark is illuminated from the rear by an opal diffusing glass 27 and a light source 28. A plurality of masks of different patterns may be provided so that the form of the fiducial mark may be varied to suit different objects being sighted upon. In Figs. 2 and 3 there is shown two convenient forms of fiducial marks that the individual masks may provide. Instead of having the masks slid into position in the holder individually as shown, a series of them may be disposed upon a rotatablbe disk so that the desired one may be brought into position by rotating the disk, as shown in Fig. 5. As shown, three different masks 25' are arcuately spaced on the supporting disc D which is rotatably supported in a partial ring 26' fixed to the frame of the sextant. The edge of the disc D may be grasped by the fingers through the slot S in the ring 26' and an indexing mechanism including a spring-pressed ball B located in the ring and adapted to engage notches N in the edge of the disc D may be provided.

The image of the fiducial mark on the mask is reflected to the uppermost portion of the rolling ball by a transparent reflector 29. The image of the fiducial mark formed in the sphere is reflected through the transparent reflectors 29 and 14 in turn to the lens-reflector combination 15 which renders the diverging bundles of rays parallel so that when they finally reach the observer's eye after reflection at 14 the image of the fiducial mark appears at infinity. At the same time, light from the celestial object is received by the index mirror 12 which, when correctly adjusted, sends the light to the fixed mirror 11 and then through the transparent reflector 14 to the eye at the viewpoint of the instrument. Thus the observer sees both the celestial object and the image of the fiducial mark in the field of view at the same time and can adjust the angular position of the index mirror to obtain coincidence.

According to this invention, the image of the artificial horizon may be of any desired shape. It may, for example, take the form of a single bright ring of any desired dimensions, or of several concentric rings, so that the image of a star or planet can be easily located at the center thereof while the sun and moon images can likewise be conveniently centered. The concentric ring arrangement, Fig. 2, is most convenient when mixed observations of the sun, moon, planets and stars are being made, since there is no need to adjust the size of the horizon between observations. Another convenient form, unattainable with ordinary bubble levels, is provided by two bright lines at right angles, or two pairs of parallel lines closely spaced and crossing at right angles, see Fig. 3. In the latter case, the images of stars and planets can be easily located at the center of the small central square and the sun and moon in regard to the crossed lines. It will be appreciated that the image of the fiducial mark reflected by the ball will be reduced due to the convex nature of the reflecting surface. For this reason, the actual size of the fiducial mark should be larger than the desired image thereof which constitutes the horizon at the viewpoint of the instrument.

In sighting instruments utilizing artificial horizons it is desirable, if not necessary, that the image of the object being sighted upon and the image of the fiducial mark constituting the horizon appear in the same focal plane and move in unison across the field of view as the instrument as a whole is tilted. This result is obtained in the present instance as follows. The virtual image of the fiducial mark formed in the reflecting surface of the ball will be formed at a point within the ball and at a depth approximately one-fourth of the diameter thereof. Accordingly, as the ball rolls along the surface the points at which this virtual image is formed in different positions of the ball along the race will define a locus which is a curved path concentric to the ball race and spaced above said race by a distance equal to approximately three-fourths of the diameter of the ball. If the focal length of the lens 16, twice traversed, is equal to the radius of the locus of the virtual image formed by reflection in the ball and if the lens 16 be located at the center of curvature of said locus, the image of the mark will appear in the focal plane of the object being sighted upon, or at infinity in this instance, at all times.

Referring to Fig. 1, it will be noticed that when the instrument is in an absolutely horizontal position the ball will be centered on the rolling surface and the reflected axial ray of the fiducial mark will strike the top of the ball and lie on the radius of curvature of the race passing through the center of the ball so that the horizon will appear exactly at the center of the field of view. However, when the instrument is tilted, the object being sighted upon will move across the field and so will the image of the fiducial mark. In order to make the image of the object sighted upon and the image of the fiducial mark move in unison across the field of view as the instrument is tilted, the optical distance between the fiducial mark and the point on the sphere where the radius of curvature of the race passing through the center of the ball enters the reflecting portion of the sphere, is substantially equal to the radius of curvature of the path of said point of entrance. In other words, with the parts in the relative positions shown in Fig. 3, the radius of curvature of the race passing through the center of the ball enters the ball at the top or at the point $x$. Now the optical distance $a+b$ between the mark and this point of entrance is made equal to the radius of curvature of the locus or path defined by this point of entrance as the ball rolls along the race. When the locus of the point of entrance is referred to, I do not infer that the point $x$ rolls around with the ball, but I mean that for every position of the ball on the race the radius of curvature of the race containing the center of the ball will enter the ball at a given point and the locus of these respective points of entrance will be a curved path concentric to the race.

There may be some instances where artificial horizons of the type including the ball rolling on a spherical concave race might be objected to for the reason that the spinning of the ball would not be sufficiently damped to allow the ball to come to rest at the lowest position on the race, and that this would introduce error. Another objection which might be raised in such an instrument is that the collection of dirt at the lowest point on the race would prevent free rolling of the ball. Although the second objection does not appear to be a serious one, for it would be possible to construct a sealed chamber that would remain free from dirt, the first objection is more important, and the effect might well prove to be serious in practice on airplanes and ships due to violent pitching, rolling and yawing.

In Fig. 4 I have shown an artificial horizon, including rolling balls, which is entirely free of the two objections mentioned and which has the added advantage that the artificial horizon can be a composite pattern of individual fiducial marks which are capable of individual adjustment as the instrument is tilted. For purposes of disclosure, this embodiment of artificial horizon is shown in association with a sextant of the type described above, although it is not limited to use with such an instrument; and accordingly, the corresponding parts of the sextant per se will be designated by the same reference characters as in the first embodiment.

According to this embodiment of the invention, the artificial horizon includes two separate rolling balls each limited to movement in one plane only. One moves in a vertical plane parallel to, or containing, the viewpoint of the instrument and the object being sighted upon; and the other in a vertical plane at right angles to this. The first, is optically linked with the field of view so that a horizontal line movable up and down is seen by the observer at infinity in the present sextant, or in the focal plane of an objective if one is used in the instrument; and the second causes a similar but vertical line to appear in the field of view. When the instrument is held steady, the point of intersection appears fixed in the field of view. Usually, since a sextant is held in the hand upon moving platforms, the lines move back and forth over the field, and insofar as the observer is concerned, it is the point of intersection that appears to move.

The main advantage when using two separate rolling balls, instead of one, lies in the fact that each ball, being confined to movement in one plane only, can move in a race in the form of a V-groove (or between two rails) so that spin is no longer possible, and at the same time any dirt that might collect falls down between the guides out of harm's way.

As shown in Fig. 4, each ball 36 and 37 rolls along its own arcuate V-groove race. Each of these races would be preferably sealed in a chamber filled with a suitable fluid for damping the movements of the ball, as in the embodiment described above, but for sake of clarity this added structure has been omitted. The ball 37 controls the horizontal lines and the ball 36 the vertical lines of the horizon pattern, by virtue of the optical means to be explained. The ball 37 rolls (in the plane of the drawings) within the arcuate V-groove race 39 along two curved lines of contact 40. The curvature of the path is fixed according to the sensitivity required and is tied up with the optical constants of the system. The ball 36 controls the vertical line and rolls in a similar arcuate V-groove race (shown endwise in section) the two curved lines of contact being indicated at 41. The radius of curvature of the two ball races is the same for the type of instrument illustrated, but, as will be explained later, these radii may differ in modified forms of the apparatus.

In Fig. 4 there is shown three separate optical systems linked together so that the celestial object being viewed is seen on an eye-piece at the same time as the horizontal and vertical fiducial lines, everything being simultaneously in focus (i. e., appearing at infinity) and both lines and object moving across the field in the same direction and at the same rate whenever the instrument is tilted through a small angle.

Referring now to Fig. 4, rays from the celestial object 13 are received by the adjustable index mirror 12 which reflects them to the fixed mirror 11 whence they are reflected to the viewpoint after they have traversed the transparent reflector 14. These rays are shown in full line. All parts shown in Fig. 4, including an index mirror 12, which is rotatable about an axis perpendicular to the plane in the drawings (but excepting the rolling balls 36 and 37), are fixed relatively to the sextant frame 10 and, hence, move whenever it is moved.

The second optical system is that concerned with the horizontal fiducial line. The rays belonging to this system are shown in broken dot and dash lines. A narrow slit 42 in an opaque mask 43 and running perpendicular to the plane of the drawing is illuminated through a diffusing plate 49 by a lamp 44. Rays from slit 42 are received by the polished metal ball 37 after reflection from the semi-transparent mirror 45 and other mirrors 46 and 47. In practice, the actual method adopted to bring the rays around from slit 42 to reflector 45 and ball 37 would depend upon the space available and the disposition of the instrument. As in the previously described embodiment, the optical distance from the slit 42 to the point on the reflecting portion of the ball at which a radius of curvature of the race 39 containing the center of the ball enters the ball surface is equal to the radius of curvature of the locus, or curved path, of said imaginary points of entrance. Thus the slit 42 is, in effect, always at the center of curvature of the path of the virtual image in the ball surface whatever the ball's position.

The highly polished ball 37 acting as a convex mirror reflects the rays up through the half transparent mirror 45 and another similar mirror 48, then through the glass plate 14 to the mirror-lens combination 15. The focal length of the lens 16, twice traversed, is equal to the radius of curvature of the path of the virtual image of 42 as seen in 37 and the lens 16 is positioned at the center of curvature of said path, so that rays diverging from the ball-mirror 37 to the lens-mirror combination are thereby rendered parallel to each other and these rays are reflected by plate 14 to the viewpoint of the instrument. An image of the horizontal slit 42 is, therefore, seen at infinity. Slight rotations of the instrument as a whole about an axis perpendicular to the plane of the drawing, cause the ball 37 to roll along its race 39 and, hence, the image of 42 appears to move in the field of view. However, owing to the specified relationship between the curvature, the focal length, and the optical distances, this movement is in the same direction, and at exactly the same rate as the movement of the image of the object (e. g., star) across the field of view, so that coincidence may be obtained in any part of the field.

The third optical system, whose rays are shown in simple broken lines, concerns the vertical fiducial line. This fiducial line may conveniently take the form of two parallel lines a few minutes of arc apart (as seen in the eye-piece), since small errors in obtaining coincidence with the vertical line are of no consequence. Coincidence with the horizontal line may then be obtained with the celestial body anywhere between the two vertical lines. This simplifies the problem of holding the instrument steady. The third optical system is exactly similar to the second optical system previously described. An opaque mask 50 is provided with a vertical transparent slit 51 (or pair of parallel slits) in the plane of the drawing, and which slit is illuminated by the lamp 44 through a diffusing plate 52. The rays after reflection from mirrors 53 and 54 are received by the half-transparent mirror 55 from which they are reflected to the reflecting surface of the ball 36.

As before, the optical distance between the slit 51 and the point on the surface of the ball at which the radius of curvature of the race 38 containing the center of the ball enters the ball surface, is equal to the radius of curvature of the path of said point of entrance in the ball as the latter rolls along the race so that the fiducial mark 51 always appears at the center of curvature of said path. As before, a virtual image of 51 is formed in the ball and the rays are reflected upwardly through transparent reflector 55 to the mirror 56, thence, to the transparent mirror 48 and up to the plate 14 to the lens-reflector combination 15. The optical distance from the virtual image in the ball 36 is made equal to the focal length of the lens 16, twice traversed, so that parallel rays finally emerge at the viewpoint and as before fiducial mark 51 moves in unison with any movements of the object 13 being observed. Hence, the intersection point of the images of the fiducial marks 42 and 51 always move in unison with the image of the object being sighted upon and all that is necessary is to rotate the index mirror 12 until coincidence is obtained.

Inasmuch as the lines of rolling contact between the balls and their races are spaced above the bottom of the groove, any dirt that might tend to collect in the groove would fall to the vertex thereof and not collect on the points of the grooved walls where they would impede free rolling contact of the ball. As shown, the bottom of the ball races 38 and 39 may be provided with a channel 60 running lengthwise of the race. This channel will serve to collect any foreign matter which might tend to collect on the guiding surfaces of the race so that such foreign matter will not impede the free rolling of the ball.

In this embodiment of the invention, a single lamp 44 and a single lens-mirror combination 15 has been utilized. With other embodiments, the two optical systems—that for the horizontal fiducial mark and that for the vertical—may be quite independent. The only advantage in such a modification is the possibility of making the sensitivities different for the two systems, the horizontal being more sensitive than the vertical. The main disadvantage is that the introduction of two reflectors such as plate 14 in the light path would involve a loss of about 10 per cent of the incident light from the star instead of only 5 per cent. This loss of light is an important factor in a sextant where the object sighted upon is a faint star, but when sighting on the moon or sun with a sextant, or when using instruments which are used to sight objects which are well illuminated, this loss of light due to the inclined plate 14 is not so important.

From the above description it is believed that those skilled in the art will appreciate the fact that an artificial horizon constructed in accordance with the present invention overcomes many long standing disadvantages possessed by ordinary bubble levels, and possesses many advantages over known artificial horizons. In the first place, the size of the image of the fiducial mark, or pattern, constituting the horizon is not varied by changes in temperature as is the size of the bubbles in ordinary levels. In the second place, the shape and size of the horizon may be altered without changing the sensitivity of the device, or vice versa. This could not be done with ordinary bubble levels. Thirdly, the configuration and size of image of the fiducial marks may be readily changed in accordance with the type of object being sighted upon, and for the purpose of facilitating bringing the image of the object and fiducial mark into coincidence.

Although I have shown and described certain specific embodiments of my invention, I am fully aware that many modifications thereof are possible. My invention, therefore, is not to be restricted to the precise details of construction shown and described, but is intended to cover all modifications coming within the scope of the appended claims.

Having thus described my invention, what I claim as new and desire to secure by Letters Patent of the United States is:

1. An artificial horizon for use with a movable sighting instrument including a sight axis and comprising an arcuate ball race fixed to the instrument to move therewith and disposed so that a chord of said race lies in a vertical plane which is parallel to the sight axis, a ball having a reflecting surface in rolling contact with said race and confined thereby to move in a curved path, a target fixed to said instrument to move therewith, means fixed to the instrument to move therewith for projecting an image of said target onto the uppermost portion of the surface of said ball and for directing the target image reflected from the surface of said ball along the sight axis of the instrument to the viewing point and constitute the horizon, the curvature of said ball race being such that the image of the target and the image of the object being sighted upon will move in unison across the field of view as the instrument as a whole is moved about any axis intersecting a vertical plane containing a chord of said race.

2. An artificial horizon according to claim 1 in which the target comprises a member spaced from said ball and bearing a suitable fiducial mark, means for illuminating said mark, and means for directing an image of said mark upon the uppermost portion of the surface of said ball.

3. An artificial horizon according to claim 1 in which the target comprises a mask provided with a transparent opening, means for diffusely illuminating said opening and means for projecting an image of said opening upon the uppermost portion of the ball.

4. An artificial horizon according to claim 1 in which the target comprises a member bearing a suitable fiducial mark, means for illuminating said mark, and means for projecting an image of said mark upon the uppermost portion of the surface of the ball, the parts being so arranged that the optical distance between the fiducial mark and the point on the ball where a radius of curvature of the race, passing through the center of the ball, enters the reflecting portion of the ball is substantially equal to the radius of curvature of the locus defined by the path of said point of entrance as the ball rolls along said race.

5. An artificial horizon according to claim 1 in which the target comprises a member spaced above and to one side of the ball and bearing a suitable fiducial mark, means for illuminating said mark, and in which the means for projecting an image of said marks on the surface of said ball comprises a transparent reflecting plate inclined to the radii of curvature of said ball race.

6. An artificial horizon according to claim 1 in which the target comprises a plurality of individual fiducial marks which are so mounted on the instrument that they can be interchangeably positioned in operative relationship with the means for projecting their image onto the ball.

7. An artificial horizon for use with a sighting instrument including a sight axis and an optical system for projecting the image of a fiducial mark to the viewpoint and which mark is to indicate the horizon, and comprising in combination an enclosed chamber fixed to the instrument to move therewith, the bottom of said chamber being spherically concaved to provide a rolling surface, a sphere in said chamber in rolling contact with the bottom thereof and having a reflecting surface, the top of said chamber including a window of transparent material extending over the range of possible movement of said sphere, a damping fluid in said chamber and immersing said sphere, the material forming the window and the damping fluid having substantially the same index of refraction, an illuminated target bearing suitable fiducial marks fixed to the instrument to move therewith and spaced from said chamber, and means including said optical system for projecting an image of said target through said window and onto the top of said sphere, and for directing the image reflected from the surface of said sphere to the viewpoint, the curvature of said rolling surface being such in relation to said optical system that the image of the target and the image of the object being sighted upon will move in unison across the field of view as the instrument as a whole is moved about any horizontal axis intersecting the vertical plane containing a chord of said race.

8. An artificial horizon according to claim 7 in which the underside of the top of the enclosed chamber is provided with an expansion recess which is outside of the normal range of movement of the sphere and which is not filled with the damping fluid, said expansion recess accounting for expansion of the fluid due to temperature changes and for trapping any air bubbles which might occur in the fluid.

9. An artificial horizontal according to claim 7 in which the enclosed chamber is composed in its entirety of a transparent material having a refractive index substantially the same as that of the damping fluid, contained therein, the bottom wall of said chamber being non-reflecting and non-transmitting with regards to light.

10. An artificial horizon for use in combination with a sighting instrument including a sight axis and an optical system for projecting the image of a fiducial mark to the viewpoint which is to indicate the horizon, and comprising in combination a pair of arcuate ball races fixed to the instrument to move therewith, and oriented with respect to one another so that the chord of one race is substantially in a plane parallel to a vertical plane including the sight axis of the instrument, and the chord of the other race is at an angle to the chord of said first mentioned race, a ball having a polished reflecting surface in rolling contact with each race; a pair of fiducial lines fixed to said instrument in spaced relation, one of said fiducial lines being normally horizontal and perpendicular to the plane of the first ball race, the other of said fiducial lines being normally vertical and parallel to the plane of the first ball race; means for projecting an image of each one of the fiducial lines onto different ones of said balls; and means for projecting the images of said fiducial lines from the individual balls into said optical system in intersecting relationship to provide a horizon, the curvature of said ball races being such that the point of intersection of the images of said fiducial lines and the image of the object being sighted upon will move in unison across the field of view as the instrument as a whole is rotated about any horizontal axis perpendicular to the plane of said ball races and any horizontal axis parallel to the planes containing said first mentioned horizontal axes.

11. An artificial horizon according to claim 10 in which the optical distance from the individual fiducial lines to the point on the surface of the ball where a radius of curvature of the race, passing through the center of the ball, enters the reflecting portion of the ball is substantially equal to the radius of curvature of the locus defined by the path of said point of entrance as the ball rolls along said race.

12. An artificial horizon according to claim 10 in which the ball races are V-grooves the bottom of which is provided with an elongated recess running lengthwise of the groove and extending below the vertex of the groove.

13. An artificial horizon according to claim 10 in which said races are oriented so that the chord of one is substantially horizontal and lies in a vertical plane containing the sight axis of the instrument, and the other race is horizontal and extends at right angles to the first mentioned race, a mask having a horizontal slit, a mask having a vertical slit, means for diffusely illuminating each of said slits whereby they constitute fiducial lines, an optical system for projecting an image of the horizontal slit onto the first mentioned ball, a second optical system for projecting an image of the vertical slit onto the second mentioned ball, and means for directing said two images into said optical system of the instrument in combined relation so that they form an artificial horizon in the form of a cross the two elements of which are individually movable relative one to the other.

14. An artificial horizon for use with a sighting instrument and comprising in combination a rolling sphere having a reflecting surface, an arcuate race for supporting said sphere in rolling contact therewith, said race being attached to said instrument in fixed relation thereto so that a chord of the race is substantially horizontal when the instrument is in use, a fiducial mark fixed to said instrument to move therewith, means connected to said instrument for projecting an image of said fiducial mark onto the surface of said sphere, means for directing the image of said mark in the sphere to the sight axis of the instrument, the curvature of said race being such that the image of the fiducial mark and the image of the object being sighted upon will move in unison across the field of view as the instrument as a whole is moved about any horizontal axis intersecting the vertical plane containing a chord of said race.

15. In an instrument for determining the horizontal direction in relation to a point of observation the combination with a primary optical system for directing an image of the object sighted upon to a viewpoint, a secondary optical system associated with said primary optical system to direct an image of an artificial horizon to said viewpoint where it is viewed simultaneously with the object being sighted upon, said secondary optical system including a transparent reflector at an angle to and cutting across the sight axis of the instrument, of an artificial horizon comprising an arcuate ball race attached to the instrument so that a chord of the race is substantially horizontal when the instrument is in use, a ball in rolling engagement with said race and having a reflecting surface, an illuminated fiducial mark attached to said instrument, and optical means for directing an image of said mark to the uppermost portion of the surface of said ball from which it is in turn directed to said secondary optical system, the curvature of said race being such that the image of the fiducial mark reflected by said ball and the image of the object being sighted upon will move in unison across the field of view as the instrument as a whole is moved about any horizontal axis intersecting a vertical plane containing a chord of said race.

16. An instrument according to claim 15 in which the optical distance between said fiducial mark and the point on the ball where a radius of curvature of the race, passing through the center of the ball, enters the reflecting portion of the ball is substantially equal to the radius of curvature of the locus defined by the path of said point of entrance as the ball rolls along said race.

17. In an instrument for determining the horizontal direction in relation to a point of observation the combination with a primary optical system for directing an image of the objected sight upon to a viewpoint, a secondary optical system associated with said primary system to direct an image of an artificial horizon into and along the sight axis to the viewpoint, said secondary system including a transparent reflector cutting across said sight axis and inclined thereto, a reflector lens combination located vertically above said transparent reflector and adapted to receive diverging image forming rays passing through said reflector and to return them to the upper surface thereof in collimated form, of an artificial horizon comprising an arcuate ball race fastened to the instrument and located below the sight axis thereof in optical alignment with said reflector-lens combination, a ball in rolling engagement with said race and having a reflecting surface, a fiducial mark fixed to said instrument to move therewith, means connected to said instrument for directing an image of said fiducial mark onto the upper surface of said ball and which image is reflected to said reflector lens combination and in turn by said transparent reflector to the viewpoint of the instrument, the radius of curvature of said race being equal to the focal length of said lens of said reflector-lens combination so that the image of the fiducial mark will appear at infinity and will move in unison across the field of view with the image of the object being sighted upon as the instrument as a whole is moved about any horizontal axis intersecting a vertical plane containing a chord of said race.

BENJAMIN E. LUBOSHEZ.